Dec. 3, 1963     V. E. DE LUCIA     3,112,759
VALVE FOR VACUUM SYSTEMS
Filed June 15, 1962
FIG. 1.
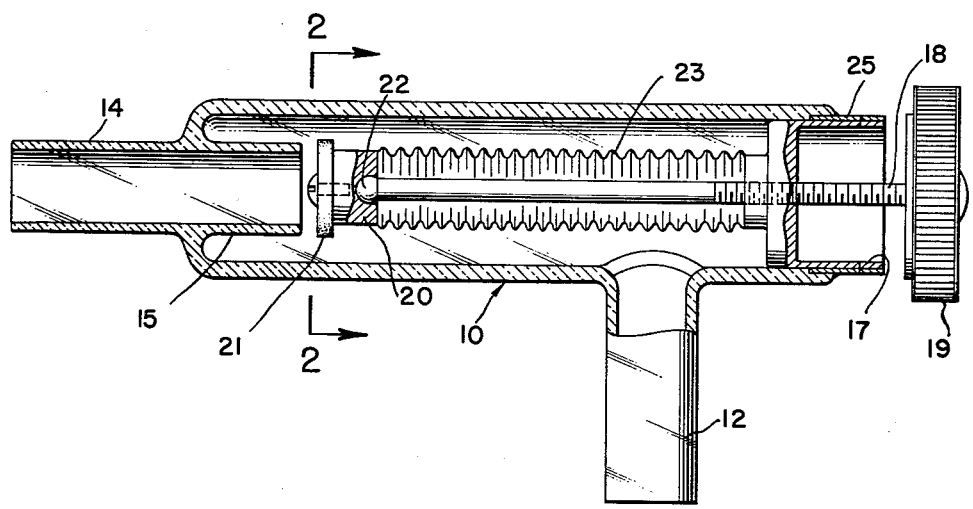
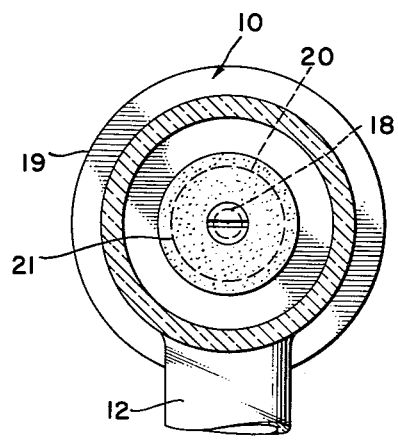
FIG. 2.
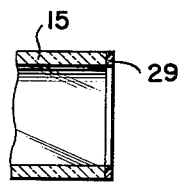
FIG. 3.
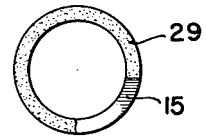
FIG. 4.
VICTOR E. DeLUCIA,
*INVENTOR.*
HERZIG AND JESSUP,
ATTORNEYS.
BY: *Albert M. Herzig*

United States Patent Office 3,112,759
Patented Dec. 3, 1963

3,112,759
VALVE FOR VACUUM SYSTEMS
Victor E. De Lucia, Santa Monica, Calif., assignor to
Resitron Laboratories, Inc.
Filed June 15, 1962, Ser. No. 202,818
6 Claims. (Cl. 137—315)

This invention relates to stop-cocks or valves particularly adapted for employment in vacuum systems for the control of vacuum or for the valving of gases in or out of said systems and for the control and flow of fluids and other materials in vacuum systems or the like.

More especially the invention relates to a valve in the form of a glass stop-cock, characterized by improvements whereby it can be installed, very easily, in a glass system, by a glass blower without destructive heating.

Stop-cocks of the prior art generally consisted of two pieces comprising a tapered plug which fits into a tapered body, the said plug being mechanically lapped into the body to achieve a near perfect mating in order to facilitate vacuum tightness. To further facilitate vacuum tightness in the prior art, grease-like substances were generally applied to the mating surfaces. The application of these materials was also to serve as lubricants. The stop-cocks of the prior art were generally subject to deficiencies including that of a high degree of technical skill as well as specialized equipment were required for their manufacture.

A deficiency was in the use of grease as a sealant and lubricant for the reason that the vapor pressure of such greases is too high to be satisfactory for ultra-high vacuum vacuum work. Ultra-high vacuum is generally defined as a region of pressure within $10^{-7}$ to $10^{-12}$ millimeters of mercury. The viscosity of such greases is dependent on temperature and such stop-cocks of the prior art become difficult to operate or turn at low temperatures and conversely easy to operate at elevated room temperatures.

At prolonged elevated room temperatures, such greases used as lubricants or the like, tend to be sucked into the vacuum systems impairing or vitiating the said vacuum and depleting the grease between the mating surfaces. This is conducive to leaks and loss of vacuum in addition to the possible mechanical freezing or binding of the plug in the stop-cock body.

When operating a system at high vacuum and such stop-cocks of the prior art are turned or actuated, a sudden burst of gas emanates into the lower pressure regions creating deleterious effects on precise measurements or making it impossible to achieve precise measurements in addition to contamination of the system. As the stop-cock is turned, a "new" surface of the grease is exposed to the vacuum and its outgassing causes the undesirable effects described above. It has also been found that high electrostatic charges are generated when such stop-cocks are turned due to the friction at the inter-face of the electrically insulated grease. Such charges on the surface of the grease in partial vacuum create an ionizing effect which tends to decompose said grease into its components of hydrogen and carbon. This decomposition causes the pressure in the vacuum system to increase measurably.

Such stop-cocks are not suitable for above atmospheric pressure as the ground plug can easily be blown out of its mating body. Cumbersome external devices must be added to prevent this occurrence at the high pressures. Such stop-cocks require a high degree of maintenance skill to insure trouble-free operation.

The object of the herein invention is to overcome all of the aforesaid deficiencies of the prior art and to do so in a simplified, inexpensive and highly effective way, and particularly to achieve this purpose in a glass valve which can be readily installed in a glass system by a glass blower.

The stop-cock or valve of this invention is constructed preferably entirely of glass or other low vapor pressure materials. The stop-cock or valve of the invention does not employ grease either as a sealant or lubricant but is nevertheless so constructed and uses materials such as to be able to achieve a perfect vacuum seal. The vapor pressures of the materials employed in the herein invention are suitable for ultra-high vacuum work even at elevated room temperatures.

A further object is to provide a stop-cock as in the foregoing which can be vacuum or pressure operated without external attachments.

A further object is to provide a stop-cock as in the foregoing which in the case of mechanical failure, can be taken apart easily for repair without disturbing the glass seals or joints. This is achieved by way of an initial end cup or fitting welded to a metal band at the end of the valve body, which is itself fused to the valve body. The welded joint between the cup and band may be cut off to repair the valve and these members may then be re-welded.

A further specific object is to provide a stop-cock having improvements as recited in the foregoing which is made of glass, which has a glass seat and which has a valve member operative without sealant or lubricant and which preferably comprises Teflon or the material known commercially as KEL–F.

A further object is to provide a stop-cock as in the foregoing wherein the valve operating stem is exteriorly operable and is sealed by way of a flexible bellows preferably made of copper or stainless steel, attached to the end cup.

A further object of the invention is to provide a stop-cock as in the foregoing wherein the end cap or cup carries a stem adjusting knob, the cup being of a metal similar to the metal of the band and which is sealed to the band by Heliarc welding.

This application is a continuation in part of previous application Serial No. 857,710 filed December 7, 1959 now abandoned.

Further objects and numerous additional advantages of the invention will become apparent from the following detailed description and annexed drawings, wherein:

FIGURE 1 of the drawings illustrates a preferred embodiment of the invention, in section;

FIGURE 2 is a section along line 2—2 of FIGURE 1; and

FIGURES 3 and 4 are views of a slightly modified form of the invention.

Referring now more particularly to the drawings, the FIGURES 1 and 2 illustrate, by way of example, a preferred embodiment of the invention. The numeral 10 designates a stop-cock made of glass having a side arm 12. The stop-cock is of a type that may be easily incorporated into any vacuum system, for example, simply by the stop-clock being installed by a glass blower.

Numeral 14 designates an extending glass tube having an inner re-entrant portion 15, the end of which forms the valve seat. The portions 14 and 15 together are long enough so that heat is not conducted to the valve seat end of portion 15 when the valve is installed by glass blowing methods.

At the other end of the valve body is an end cap or cup 17 preferably formed of an appropriate metal and through which extends the screw threaded valve stem 18. At the end of the stem is a knurled adjusting knob 19. At the inner end of the stem, is the valve member 20 which carries a disc or washer 21 made of Teflon or KEL-F. Preferably, the valve member receives a ball 22 received in a spherical opening in the valve member 20 to allow universal movement of the valve member to ensure the most effective and positive seating.

Teflon is a known commercial material and is a tetrafluoroethylene resin. It is inert to nearly all chemicals and solvents. It is capable of continuous service at 500° F. It has a low coefficient of friction, resists adhesion to most materials and has a low moisture absorption. KEL-F is a polymer of tri-fluorochloroethylene, characterized by formula $(CF_2-CFCl)_x$.

The KEL-F polymer molecule consists primarily of a carbon skeleton and two halogens, fluorine and chlorine, present in the mol ratio of three to one respectively. This combination of carbon and halogens yields a colorless, non-flammable material that is exceptionally stable, highly temperature resistant, chemically inert and a true thermoplastic. Chlorine in the molecule contributes to the transparency, exceptional flow and rigidity characteristics of the polymer. Fluorine is responsible for its chemical inertness and zero moisture absorption.

The stem is sealed by a surrounding flexible bellows 23 which may be made of copper or stainless steel or other suitable bellows material, the bellows being seatingly attached at one end to the valve member and at the other end to the cup member 17. The cup snugly fits within the band and these two parts are attached preferably by Heliarc welding. This type of welding requires just enough heating so that the two metals fuse together, there being insufficient heat to affect any other part of the structure. The weldment forms a fused seal.

Preferably the band 25 consists of a material with a thermal coefficient of expansion similar to the glass of which body 10 is made. A preferred representative combination comprises a commercial alloy known as Kovar which consists of 29% nickel, 17% cobalt and the remainder iron. The glass body structure has an expansion property very similar to this alloy and is designated as Corning 7052 in the preferred combination. The junction or joint between element 25 and the glass body is made by oxidizing the periphery of band 25 where the seal is to be made by elevating its temperature to approximately 1000 degrees C. while simultaneously heating the edge of the glass to the same temperature. The glass in this state becomes plastic and is shaped by means of a carbon rod to fit the contour of the oxidized area on the periphery of band 25. In this manner the oxide of the Kovar is absorbed into the glass forming a sealed vacuum type joint of high mechanical strength. This joint remains intact over great temperature extremes because of the excellent expansion watch of this combination.

In the event of any malfunction of the valve requiring for example replacement of the valve member, the valve body can be opened at the area of the welded metal surfaces formed by the band 25 and the cup 17. When the repairs have been effected, the body can be reclosed at this point by again welding the band and cup in the manner described above. The band 25 and cup 17 may be welded only at their ends and when opening the valve, the welded end may be cut off and then re-welded. Thus this may be done repeatedly with re-welding and re-sealing without imparing the effectiveness of the assembly.

One of the advantages of the use of Teflon in this particular valve is the high compressive strength of the material and its low cold flow characteristics. It is stable over a wide temperature range, being capable of withstanding a temperature up to 390° Fahrenheit without change in characteristics. In other words, if it were necessary to outgas by the application of heat, this could be done up to a temperature of 390° Fahrenheit without affecting the characteristics of the Teflon or if the valve is subjected to an environmental temperature of this degree, the materials would be able to withstand it.

From the foregoing, those skilled in the art will observe that the invention achieves and realizes all of the advantages outlined in the foregoing. No sealant or lubricants are required or used and accordingly, there can be no outgassing or emanation of gases from such sealant or lubricant. A high vacuum can accordingly be more effectively realized and maintained and the precision and accuracy of measurements of high vacuums is not impaired or disturbed by the presence of or release of gases from sealants or lubricants.

In a slightly modified form of the invention shown in FIGURES 3 and 4, the end of the reentrant tube portion 15 is coated with Teflon as shown at 29 in the FIGURES. In this form of the invention, a Teflon to Teflon seal is produced rather than a Teflon or KEL-F to glass seal. An advantage of this arrangement is that the Teflon pieces will not stick together and more seating pressure can therefore be applied. It is known that the glass can be appropriately coated with Teflon for this purpose. Those skilled in the art will, therefore, observe that a desirable combination of advantages is realized due to the effective sealing properties of the Teflon, its high compressive strength, low cold flow characteristics and its temperature stability, all coupled with the fact of there being no sealant or grease used which would outgas or otherwise be subject to the deficiencies of the prior art as outlined in the foregoing.

The foregoing disclosure is representative of preferred forms of the invention and is to be interpreted in an illustrative rather than a limiting sense, the invention to be accorded the full scope of the claims appended hereto.

What is claimed is:

1. A valve adapted for use in high vacuum systems comprising a cylindrical glass body, means within the body forming a flat valve seat, a cylindrical metal band fused to one end of the glass body and protruding therefrom, a cup-shaped member fitting within said band contiguously therewith, said band and cup-shaped member being welded together adjacent the outer ends thereof forming a seal whereby the welded end part may be cut off and the band and cup-shaped member re-welded together, a valve stem extending through the cup-shaped member and having mounted thereon a disc-shaped valve member formed of a tetrafluoroethylene resin positioned to be movable reciprocally to engage with the said seat to form a seal and means for operating the valve member.

2. A valve as in claim 1 wherein the valve body has a re-entrant tube portion at one end having a part extending inwardly into the interior of the valve body, said valve seat being formed at the end of the said inwardly extending part.

3. A valve as in claim 2 including a ball and socket joint connecting the valve member to its operating stem allowing universal seating movement of the valve member with respect to the seat.

4. A valve for use in high vacuum systems comprising an elongated tubular glass body; a tubular glass inlet extending laterally from said body intermediate the ends thereof; a tubular glass outlet at one end of said body, coaxial therewith and having an inner end spaced inwardly of the end of said body and defining a valve seat; an annular metal band sealingly fused to said body at the other end thereof and projecting axially therefrom to define an open tubular metal end for said body; a metal cup telescopically positioned in said other end of said body with its base inwardly of said other end being fused to said annular band around the end thereof to seal said other end; and valve means movably carried by said cup and cooperating with said valve seat and having an operating member extending through said cup.

5. A valve as defined in claim 4 wherein said operating member comprises a rod threaded through the base of said cup axially of said body; and a tubular metal bellows encompassing said rod within said body and being sealingly welded to said valve means and to the inner surface of the base of said cup.

6. A valve as in claim 5 wherein the glass of the body and the material of said band have substantially the same coefficients of thermal expansion.

References Cited in the file of this patent
UNITED STATES PATENTS

| | | |
|---|---|---|
| 2,711,846 | Birchall | June 28, 1955 |
| 2,771,900 | Dayton | Nov. 27, 1956 |
| 2,793,654 | Biermann | May 28, 1957 |
| 2,926,885 | Szulc | Mar. 1, 1960 |

FOREIGN PATENTS

| | | |
|---|---|---|
| 808,227 | France | of 1937 |
| 721,011 | Great Britain | of 1954 |